May 24, 1938. B. F. BLANCHARD 2,118,337
CUSPIDOR HOLDER FOR MOTOR VEHICLES
Filed April 2, 1937
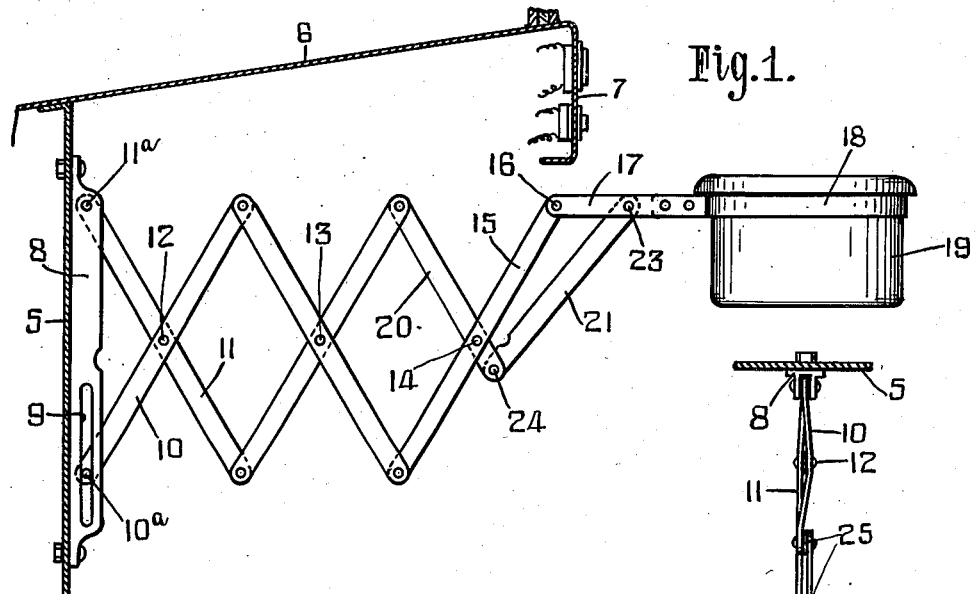
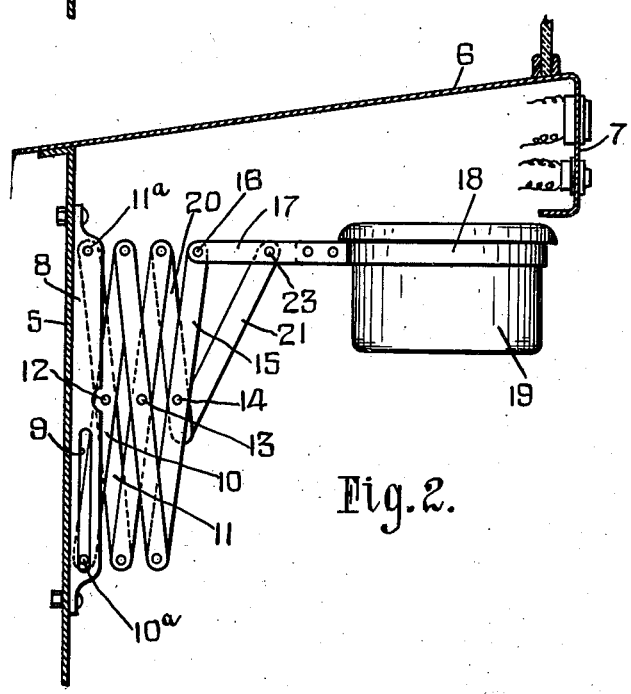
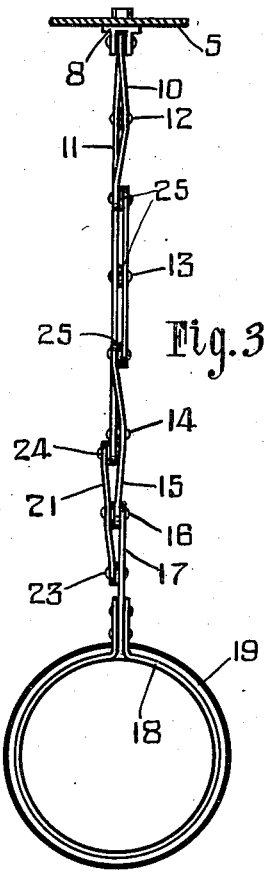
Inventor
BENJAMIN F. BLANCHARD
By Finckel Finckel
Attorneys Patented May 24, 1938

2,118,337

UNITED STATES PATENT OFFICE 2,118,337

CUSPIDOR HOLDER FOR MOTOR VEHICLES

Benjamin F. Blanchard, Linden, Ohio

Application April 2, 1937, Serial No. 134,601

2 Claims. (Cl. 248—277)

Chewers and smokers of tobacco suffer considerable annoyance while driving or riding in an automobile, especially in the winter when the weather is cold or wet and it is therefore desirable to keep the door and windows closed and undesirable to expectorate or throw debris onto the floor or upholstery of the car.

The special object of the present invention is to provide an improved bracket adapted to support a removable cuspidor within the automobile, said bracket being of simple and economical form, and such that the cuspidor can be drawn out from a substantially concealed position into an exposed position convenient for use. Another object is to provide such a bracket that it will yieldingly remain in the position to which adjusted. Other objects will appear from the disclosure herein.

The invention is embodied in the example herein shown and described, the feature of novelty being finally claimed.

In the accompanying drawing—

Figure 1 is a view in side elevation of the device according to the invention, showing the bracket extended.

Fig. 2 is a similar view showing the bracket contracted.

Fig. 3 is a plan view looking at the lower side of the bracket extended.

In the views 5 designates the dash, and 6 the cowl of an automobile, at the rear of which latter is the instrument board.

The character 8 designates a supporting or fixed bracket secured at its top and bottom to the dash by bolts and nuts. The supporting bracket has in its lower portion a vertical slot 9 engaged by a pin 10ª on one of the innermost arms or levers 10 and a lazy tongs structure. The other innermost arm 11 of the lazy tongs is pivotally secured to the upper end of the said fixed bracket at a fixed point by a pin 11ª.

The innermost arms 10 and 11 of the lazy tongs are pivoted together at 12 while the remaining arms or levers are pivoted together, as usual in lazy tongs, intermediate their connected and pivoted ends at 13 and 14.

One of the outermost lazy tong arms 15 is of normal length and has pivotally connected with it at 16 a horizontal arm 17 that has doubly riveted to it at its outer end a ring 18 to support a cuspidor 19, or other article.

The other outermost lazy tong arm 20 is greatly shortened beyond the pivot 14; and pivotally connecting, as at 24 and 23, between said shortened portion and the horizontal arm 17 is a link 21. The distance between the pivotal points 16 and 23 is considerably greater than the distance between the pivotal points 14 and 24, as shown, with the result that the link 21 tends normally to support the cuspidor holding arm 17 in elevated position and in line with the upper hinging points of the lazy tongs or in a substantially horizontal position at all times.

Small spacing washers, such as shown at 25, Fig. 3, can be interposed on the pivots between the arms.

In the construction of the bracket, as shown, the arms are preferably made of suitable spring metal; and some of the said arms, as for example the arms 10 and 15, are somewhat flexed and have their lapping ends where pivoted together in reverse so as to maintain said arms in the flexed condition and thereby cause sliding impingement with pressure between adjacent arms with the effect that the collapsing and expanding movements of the lazy tongs are each somewhat restrained by the braking or frictional effect between the flexed and unflexed arms.

The advantage of this braking effect is that the lazy tongs and cuspidor are held, but yieldingly held, in the position to which intentionally adjusted and the lazy tongs therefore prevented from shifting either inward or outward by reason of a change from the normal horizontal position of the vehicle to an inclined one, as for example, in going down or up a steep grade.

In practice therefore when a driver, or his companion on the same seat, desires to expectorate or to dispose of a cud or the stub of a cigar or cigarette or ashes the cuspidor can be drawn out to exposed position and used for the purpose thereby avoiding the necessity of opening a door or window of the vehicle, especially when the vehicle is being driven.

If desired the stationary bracket can be mounted in an inverted position, to wit: with the vertical slot 9 uppermost and this without changing at all the lazy tongs; but for the use specifically described the mounting shown and described is preferred.

The forms of the parts can be changed without departing from the gist of the invention as claimed.

What I claim is:

1. A cuspidor holder suitable for a motor vehicle including a stationary bracket having a vertical slot, a lazy tongs including arms of spring material having the extremity of one of its innermost arms slidingly connected with said slot and the end of its other innermost arm pivotally connected at a fixed point to said bracket whereby the lazy tongs is extensible and contractible in a substantially horizontal direction, some of said lazy tongs arms being flexed and pivotally connected at their outer ends in reverse to rub in action against contiguous arms and thereby generate friction for yieldingly resisting movement of said lazy tongs, means supporting said cuspidor at the outermost end of said lazy tongs including an arm having a cuspidor seat and said arm connected to the extremity of one of the outermost arms of the lazy tongs, and a link for supporting the said arm carrying the cuspidor seat, said link pivotally connected with said last named arm and to the other outermost arm at a point relatively near the pivotal connection of the said outermost arms of the lazy tongs.

2. A cuspidor holder suitable for a motor vehicle including a stationary bracket, a lazy tongs including arms of spring material and having the extremities of its innermost arms connected with said bracket for contraction and extension of the lazy tongs, and means for supporting the cuspidor in a substantially horizontal position connected with the outermost arms of said lazy tongs, some of the arms of said lazy tongs being flexed and pivotally connected at their outer ends in reverse to rub in action against contiguous arms and thereby generate friction for yieldingly holding the lazy tongs in adjusted position.

BENJAMIN F. BLANCHARD.